United States Patent [19]

Missun

[11] 4,418,476
[45] Dec. 6, 1983

[54] OFFSET INDICATOR EXTENSION

[76] Inventor: Heinz E. Missun, 7824 Via del Mundo, Scottsdale, Ariz. 85258

[21] Appl. No.: 344,319

[22] Filed: Feb. 1, 1982

[51] Int. Cl.³ .............................................. G01B 3/22
[52] U.S. Cl. .................................................. 33/172 B
[58] Field of Search ................ 33/169 C, 172 B, 173, 33/DIG. 6

[56] References Cited

U.S. PATENT DOCUMENTS

| | | | |
|---|---|---|---|
| 2,231,805 | 2/1941 | Freitas | 33/172 B |
| 2,383,272 | 8/1945 | Page | 33/172 B |
| 2,649,783 | 8/1953 | Baugh | 33/172 B |
| 2,898,686 | 8/1959 | Croshier et al. | 33/172 B |
| 2,984,911 | 5/1961 | Hagar | 33/172 B |
| 2,994,961 | 8/1961 | Nakagawa | 33/172 B |
| 3,079,693 | 3/1963 | Miner, Jr. | 33/172 B |
| 3,464,118 | 9/1969 | Nagata | 33/172 B |

*Primary Examiner*—Richard R. Stearns
*Attorney, Agent, or Firm*—Harry M. Weiss

[57] ABSTRACT

An extension is provided for use with a basic offset indicator tool so as to permit locating the center of deep holes, the center of hard to get at holes, or surface irregularities in hard to get at areas. The extension includes a mounting portion for receiving a dovetail mounting plate on the indicator tool itself. A linking member pivotable at its midpoint within the extension housing engages at its upper end a needle of the basic offset indicator tool. The lower end of the pivotable linking member engages a pivotable lever which is frictionally coupled to another needle. This second needle, the lever, and the needle of the basic tool are all of substantially the same length.

11 Claims, 5 Drawing Figures

U.S. Patent   Dec. 6, 1983   4,418,476
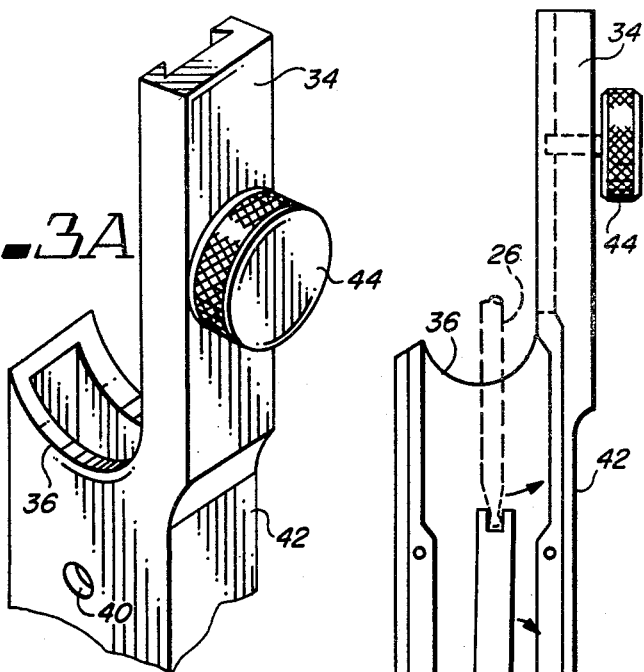
FIG.3A
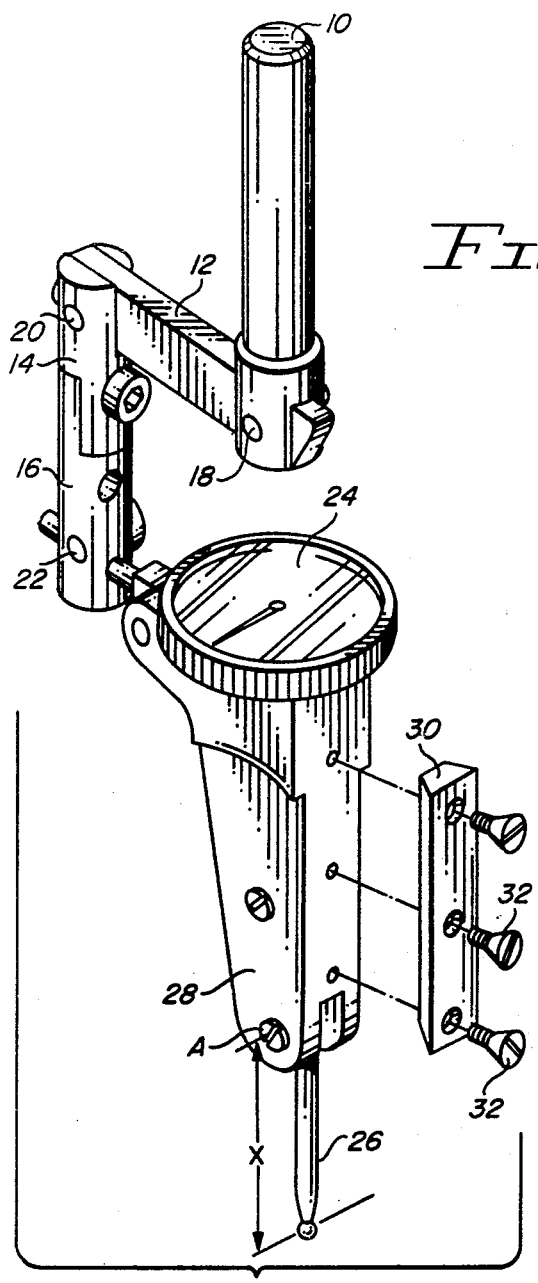
FIG.1 PRIOR ART
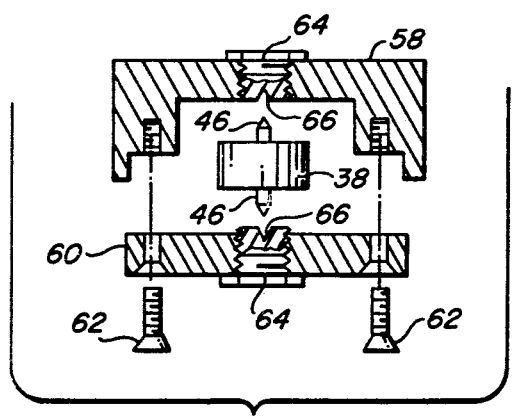
FIG.4
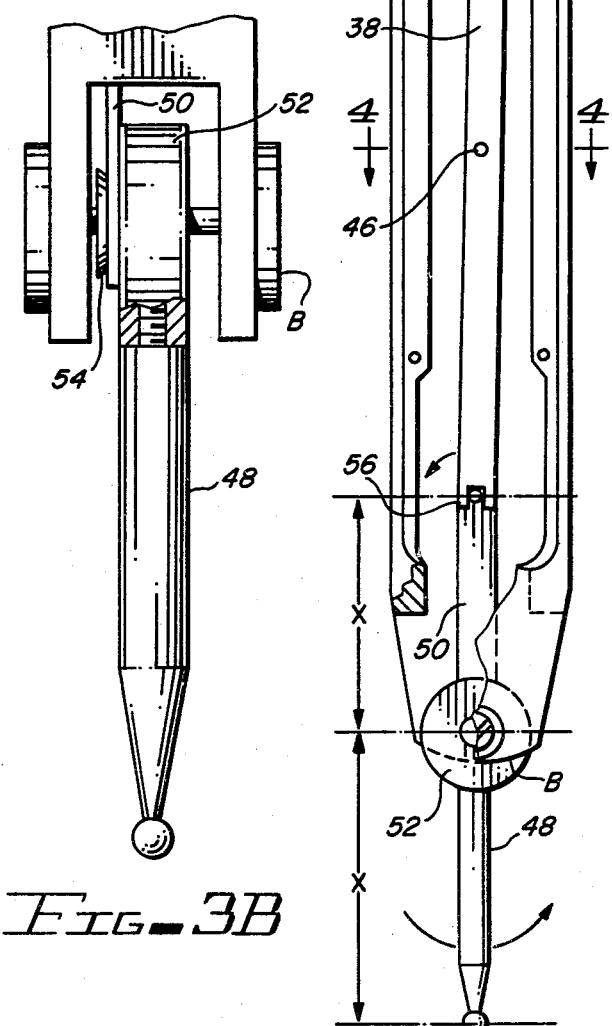
FIG.3B
FIG.2

OFFSET INDICATOR EXTENSION

BACKGROUND OF THE INVENTION

1. Field of the Invention

This invention relates generally to an apparatus for determining the center of a hole and, more particularly, to an extension for use with an offset indicator so as to permit location of the center of deep holes, the center of hard to get at holes or surface irregularities in difficult to reach places.

Offset indicating tools of the type manufactured by Interrapid of Switzerland are used in conjunction with milling machines such as jig borers, boring mills, etc. These offset indicators may be used, for example, to locate the center of a hole or measure surface irregularities and consist generally of a pivotable handle assembly, an indicator dial, a pivotable ball point needle, and linkage coupled between the needle and the indicator dial for transmitting needle movememt to the indicator dial. Such a tool, properly positioned at the center of a hole will register zero on the indicator dial as the tool is turned causing the ball point to travel across the inner surface of the hole. If the tool is not positioned in the center of the hole, the needle will be forced to pivot as the point rides along the inner surface of the hole resulting in reading on the indicator dial which is indicative of the degree to which the tool is off center.

It is often necessary to make measurements such as locating the center of a hole in difficult to reach areas. This problem has been solved in two ways. First, the entire offset indicator tool has been made longer in order to increase its reach. Such lengthened tools are significantly more expensive and are much less versatile. Second, the standard ball point needle has been replaced by a longer needle. While not as expensive as the first solution, the indicator readings generated by a tool modified in this manner are no longer accurate representations of offset.

SUMMARY OF THE INVENTION

It is an object of the present invention to provide an improved apparatus for locating the center of a hole.

It is a further object of the present invention to provide an extension for an offset indicator tool.

It is a still further object of the present invention to provide an apparatus which, when coupled to a conventional offset indicator tool, will permit accurate measurements in difficult-to-reach areas.

According to a broad aspect of the invention there is provided an apparatus for extending the reach of an offset indicator tool of the type which includes an offset indicator dial, a first pivotably mounted needle, and a mechanism for converting movements of said first needle into indicators on said dial, said apparatus comprising a housing; a linking member pivotably coupled within said housing and having a first end for cooperatively engaging said first needle so as to transmit movements of said linking member to said first needle; a lever pivotably mounted about a first point on said housing and having an upper end for cooperatively engaging a second end of said linking member so as to transmit movements of sid lever to said linking member; and a second needle pivotably mounted about said first point on said housing and in frictional engagements with said lever such that movements of said second needle are transmitted to said lever.

The above, and other objects, features and advantages of the present invention will be better understood from the following detailed description taken in conjunction with the accompanying drawings, in which:

BRIEF DESCRIPTION OF THE DRAWINGS

FIG. 1 is an isometric view of a traditional offset indicator tool;

FIG. 2 is a plan view of the inventive extension having a front face thereof removed so as to expose the interior workings of the extension;

FIGS. 3A and 3B illustrate in more detail the upper and lower portions of the inventive extension; and FIG. 4 is a cross sectional view of the inventive extension taken along line 4—4 in FIG. 2.

DESCRIPTION OF THE PREFERRED EMBODIMENT

FIG. 1 is an isometric view of a standard offset indicator tool. It comprises a handle assembly including members 10, 12, 14 and 16 which are pivotably coupled together and to the main indicator body at points 18, 20 and 22. The main body consists of an offset indicator dial 24 and a pivotably mounted ball point needle 26 which is coupled via linkage contained in housing 28 to indicator dial 24 so that movements of the ball point needle will be reflected by readings on the indicator dial. Ball point needle 26 and a portion of the linkage in housing 28 are both coupled so as to pivot about a point A. Needle 26 which pivots about point A has a length X. As can be seen, the indicator tool of FIG. 1 is equipped with a dovetail adapter plate 30 which is secured to housing 28 by screws 32.

An offset indicator tool of the type described above and shown in FIG. 1 may be obtained from Interrapid of Switzerland. Therefore, a more detailed discussion is not deemed necessary.

FIG. 2 illustrates the inventive extension to be used in conjunction with the offset indicator tool shown in FIG. 1 to reach difficult-to-reach areas or for use in deep holes.

Referring to FIGS. 2 and 3A, the upper portion of the extension is equipped with an adapter 34 having a dovetail configuration (shown in FIG. 3A) for receiving adapter plate 30. Adapter 34 guides the housing 28 of the indicator tool until the lower curved portion of housing 28 engages a curved portion 36 of the extension housing. In doing so, the ball of needle 26 of the indicator tool (shown dotted in FIG. 2) engages a slot of pivotable linking member 38. In order to determine that proper mating has been accomplished between needle 28 and linking member 38, an aperture 40 (FIG. 3A) is provided in a wall of extension housing 42 to permit visual inspection of the ball of needle 26 and the upper portion of pivotable linkage 38. After proper mating is verified, the extension may be secured on the indicator by tightening thumb screw 44 which will then bear against adapter plate 30.

Linking member 38 is mounted within housing 42 so as to pivot about a pin 46 which protrudes from opposite sides of linkage 38. The pin then engages precision bearings in opposite walls of housing 42. Pin 46 is located midway between the upper and lower ends of member 38.

Referring to FIGS. 2 and 3B, the inventive extension is also equipped with a ball point needle 48 which pivots about a point B and has a length X. A lever 50 is mounted in frictional engagement with the upper portion 52 of a needle assembly comprising elements 54, 52 and 48 by snapping it over protrusion 54. Lever 50 also measures a length "x" from pivot point B to its upper end which is equipped with a peg 56 which is, in turn, engaged by a slot in the lower end of the linking member 38. Due to the frictional engagement between the needle assembly and the lever 50, the needle 58 may be manually adjusted to reside in a particular desired angular relationship with the lever 50. The length "x" is the same length in two places shown in FIG. 2 (see also the same length "x" in FIG. 1).

FIG. 4 is a cross-sectional view of the inventive extension taken along line 4—4 in FIG. 2. As can be seen, housing 42 consists of a first three-sided member 48 and a second member 60 which may be coupled to member 58 by screws 62 to form a housing having a generally rectangular cross section. Threaded into apertures in members 58 and 60 are precision bearings 64 each having an indentation 66 therein for receiving the pointed ends of pin 46. As stated previously, pin 46 is fixedly coupled to linking member 38. In this manner, linking member 38 is free to rotate in bearings 64 under the influence of needle 48 and lever 50.

Since linking member 38 is pivotable about its midpoint, and since lever 50 and needle 48 each have a length X which is equal to the length of needle 26 in the indicator itself, motion will be transmitted to needle 26, via linkage 38, lever 50 and needle 48, which is equivalent to that which needle 26 would itself undergo if the indicator tool itself were performing the measurement.

The above described extension permits the basic offset indicator tool to be lengthened in those instances where it is necessary to reach a difficult to reach area without sacrificing accuracy. The extension may be easily coupled to and de-coupled from the basic indicator tool thus leaving the basic tool (without modification) available for run-of-the-mill measurements.

The above description is given by way of example only. Changes in form and details may be made by one skilled in the art without departing from the scope of the invention as defined by the appended claims.

What is claimed is:

1. An apparatus for extending the reach of an offset indicator tool of the type which includes an offset indicator dial, a first pivotably mounted needle, and a mechanism for converting movements of said first needle into indications on said dial, said apparatus comprising:
   a housing;
   a linking member pivotably coupled within said housing and having a first end for cooperatively engaging said first needle so as to transmit movements of said linking member to said first needle;
   a lever pivotably mounted about a first point on said housing and having an upper end for cooperatively engaging a second end of said linking member so as to transmit movements of said lever to said linking member; and;
   a second needle pivotably mounted about said first point on said housing and in frictional engagement with said lever such that movements of said second needle are transmitted to said lever.

2. An apparatus according to claim 1 further comprising securing means for fixedly attaching said apparatus to said offset indicator tool.

3. An apparatus according to claim 2 wherein said offset indicator tool is equipped with a dovetail adapter plate and wherein said apparatus further comprises:
   dovetail receiving means for engaging said dovetail adaptor plate; and
   screw means threadably coupled within said dovetail receiving means for bringing pressure to bear on said adapter plate so as to secure said receiving means to said adapter plate.

4. An apparatus according to claim 2 wherein said linking member is pivotably coupled about a second point which is equidistant said first and second ends.

5. An apparatus according to claim 4 wherein said linking member is provided with first and second protrusions extending from opposite sides of said linking member at said second point.

6. An apparatus according to claim 5 wherein said first and second protrusions engage first and second bearings respectively each one of which is located in an opposite wall of said housing.

7. An apparatus according to claim 6 wherein said housing has a substantially rectangular cross-section.

8. An apparatus according to claim 4 wherein said first and second ends of said linking member are equipped with slots for engaging said first needle and said lever respectively.

9. An apparatus according to claim 8 wherein said lever is equipped with a peg fixedly coupled thereto which engages the slot in said second end of said linking member.

10. An apparatus according to claim 9 wherein said second needle has a ball point.

11. An apparatus according to claim 4 wherein said first needle, said second needle and said lever are substantially the same length.

* * * * *